(12) United States Patent
Arold

(10) Patent No.: US 6,394,891 B1
(45) Date of Patent: May 28, 2002

(54) NOZZLE FOR VENTILATING A MOTOR VEHICLE

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/574,894

(22) Filed: May 19, 2000

(30) Foreign Application Priority Data

May 28, 1999 (DE) .......................... 199 24 493

(51) Int. Cl.[7] .................................. B60H 1/34
(52) U.S. Cl. ........................ 454/155; 454/324
(58) Field of Search .................. 454/152, 155, 454/323, 324

(56) References Cited

U.S. PATENT DOCUMENTS 6,146,265 A * 11/2000 Greenwald .................. 454/155

FOREIGN PATENT DOCUMENTS

| DE | 2927-217 A | * 8/1990 | .................. 454/155 |
| DE | 197 48 998 C1 | 10/1998 | |
| GB | 2129119 A | 5/1984 | |
| JP | 62-134317 A | * 6/1987 | .................. 454/155 |

OTHER PUBLICATIONS

Combined Search and Examination Report under Sections 17 and 18(3) dated Oct. 12, 2000 from the Patent Office in South Wales.

* cited by examiner

Primary Examiner—Harold Joyce
(74) Attorney, Agent, or Firm—Crowell & Moring LLP

(57) ABSTRACT

A nozzle for ventilating a vehicle interior, having a housing which has an air outflow opening which can be closed by a panel when not in use, and having an insert which accommodates air-guiding vanes in a pivotable manner and which is held movably in the housing for the purpose of moving the air-guiding vanes out of the air outlet opening during closing of the panel. In order to integrate the nozzle housing in dashboards of differing design, the insert is designed as a frame-like slide which can be displaced longitudinally in the housing and can be moved into the depth of the housing by a defined displacement path to enable the panel to close the air outflow opening.

14 Claims, 2 Drawing Sheets

NOZZLE FOR VENTILATING A MOTOR VEHICLE

BACKGROUND OF THE INVENTION

1. Field of the Invention

The invention relates to a nozzle for ventilating a vehicle interior, such as used to direct air from an air conditioning system.

2. Description of Prior Developments

In the case of a known air nozzle of this type (DE 197 48 998 C1), in order for the air nozzle when not in use to have a covering which can be closed in a visually neat manner and which fits unobtrusively into the harmony and aesthetics of the interior trim, the nozzle insert carrying the air-guiding vanes is designed as a roller-like, hollow pivoting insert. This insert is mounted pivotably about its roller axis and has a casing opening which is essentially congruent with the air outflow opening. The roller insert is coupled to the panel designed as a rolling and closing screen in such a manner that with increasing pivoting of its casing opening away from the air outflow opening, it covers the opening to the same extent with the rolling and closing screen. This constructive configuration of the air nozzle always requires the nozzle front side to have an external contour curved in the form of a circular arc, which signifies a restriction on the structural freedom of the design of the dashboard in which such air nozzles are generally arranged.

SUMMARY OF THE INVENTION

The invention is based on the object of constructively modifying a nozzle for ventilating a vehicle interior of the type mentioned above in such a manner that the shape of the nozzle housing, in particular its front contour, can be configured in any desired manner without having to omit a covering for the nozzle opening when not in use.

The air nozzle according to the invention has the advantage that, in contrast to the roller insert, a slide can be constructively adapted to any configuration of the front contour of the nozzle housing without a problem and places no demands on the configuration of the front contour of the nozzle housing in terms of design. The air nozzle can therefore advantageously be used in all dashboards or instrument panels of differing design. Moving a slide into the depth of the nozzle housing to enable the panel to close the air outflow opening causes the air-guiding vanes to be displaced sufficiently far out of the air outlet opening that the movement of the panel in order to close the outlet opening is not impeded. This is also necessary in particular, since the gripping strip conventionally fitted onto an air-guiding vane and intended for manual pivoting of the air-guiding vanes and for setting of the air outflow direction has to protrude somewhat out of the air outlet opening over the contour of the housing, to enable the gripping strip to be gripped in an ergonomic manner, and would therefore never permit the closing of the panel.

BRIEF DESCRIPTION OF THE DRAWINGS

The invention is described below in more detail with reference to exemplary embodiments illustrated in the drawing, in which, in each case in a largely schematic illustration.

DETAILED DESCRIPTION OF THE PREFERRED EMBODIMENTS

Figure 1:
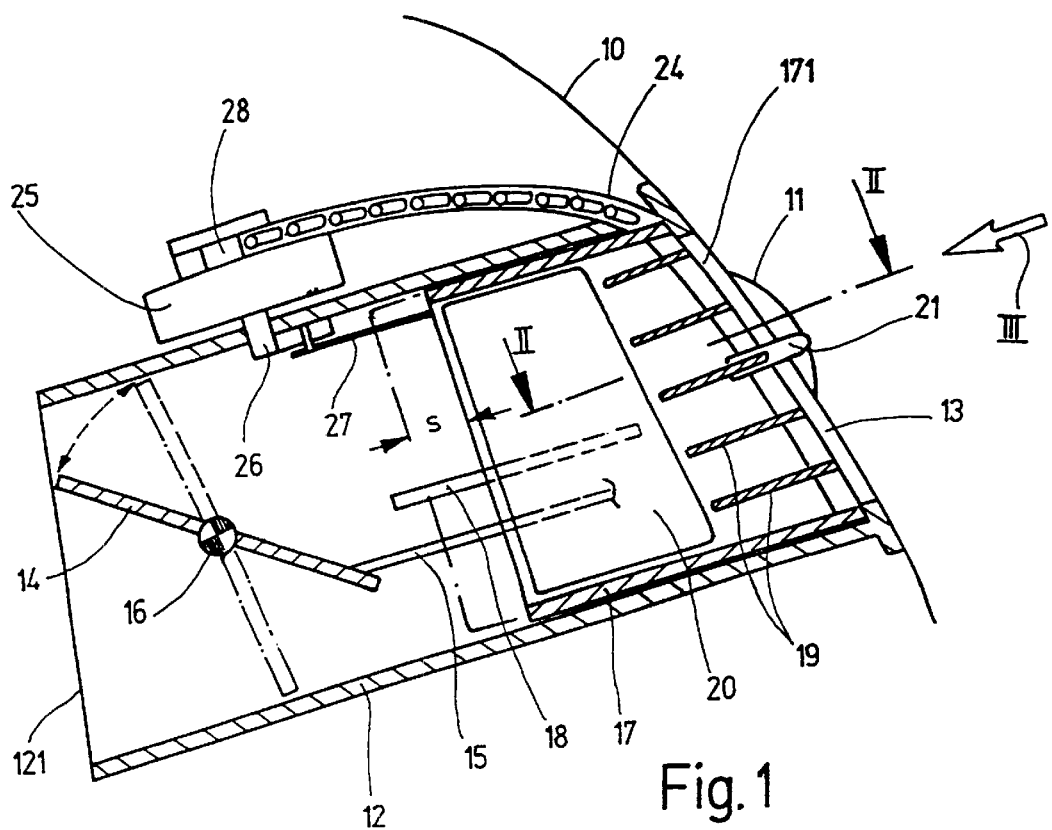
FIG. 1 shows a longitudinal section of a nozzle for ventilating the central plane of a vehicle interior.
Figure 3:
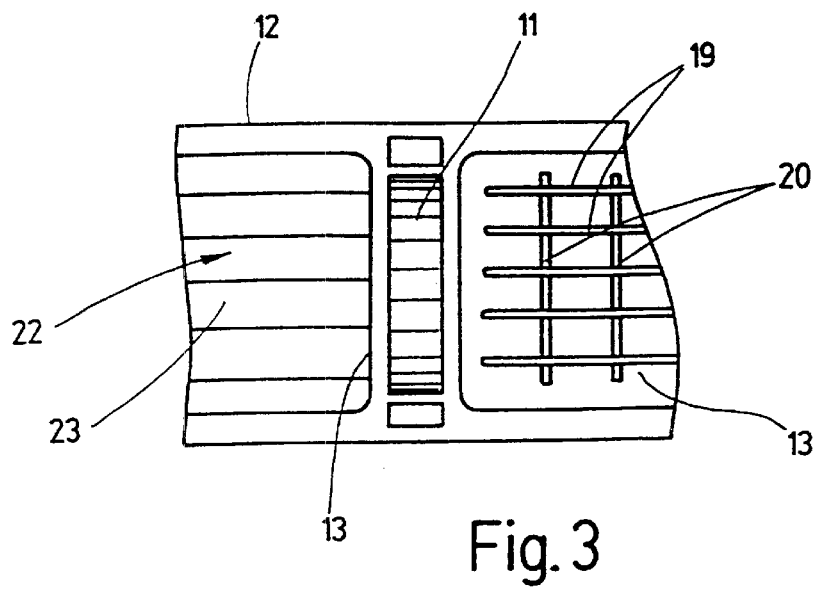
FIG. 3 shows a plan view in the direction of arrow III in FIG. 1.

The nozzle illustrated in longitudinal section in FIG. 1 is used for the ventilation of the central plane of a vehicle interior and is integrated as a so-called central nozzle in the dashboard 10 of a motor vehicle. As can be seen in the front view, part of which is illustrated in FIG. 3, two such central nozzles for separately ventilating the left-hand and right-hand halves, i.e. the driver's side and front-passenger's side, of the vehicle interior are inserted into the middle of the dashboard 10. The illustration here is of the central nozzle which is on the left in FIG. 3 when not in use and of the right central nozzle when in use. When in use, conditioned air flows out of the nozzle and ventilates the associated region of the passenger interior, and when not in use no ventilation takes place. Each nozzle is assigned an adjusting wheel 11 for regulating the quantity of air flowing out. In FIG. 3, only the adjusting wheel 11 assigned to the left central nozzle is illustrated.

Each nozzle has a housing 12 which is inserted into a recess in the dashboard 10, has an air outflow opening 13 on the front side and, with its end side 121 which faces away from the air outflow opening 13, is fitted on an air duct (not illustrated here) via which conditioned air is fed to the nozzle from an air-conditioning system. The quantity of air flowing into the housing 12 from the air duct is regulated by means of a pivoting flap 14 which is coupled via a linkage 15 to the adjusting wheel 11 and, by manual actuation of the adjusting wheel 11, the flap can be pivoted about its pivot axis 16 into any desired pivoted position. In the one final pivoted position (illustrated by dash-dotted lines in FIG. 1), the pivoting flap 14 covers the entire housing cross section 12, with the result the nozzle is completely closed. In its other final pivoted position, the pivoting flap 14 is aligned parallel to the axis of the housing 12 and releases the housing cross section completely.

Arranged in the housing 12 is a frame-shaped slide 17 whose frame sides bear against the inner wall of the housing 12 with a clearance, and which can be displaced longitudinally in the direction of the housing axis. In order to exclude any possible tilting of the slide 17 in the housing 12, the slide 17 is guided by guide pins, protruding from opposite frame sides, in longitudinal guides 18 which are incorporated in the housing wall. Air-guiding vanes 19, 20 are accommodated in a pivotable manner in the frame-shaped slide 17. A first set of air-guiding vanes 19 aligned parallel to one another is aligned horizontally, and a second set, which is arranged upstream of the first set, as seen in the direction of flow of the air, of air-guiding vanes aligned parallel to one another is aligned vertically.

In order to pivot the air-guiding vanes 19, 20 about their respective pivot axes, a gripping strip 21 is fitted onto one of the horizontally aligned air-guiding vanes 19. Vertical displacement of the gripping strip 21 enables the air-guiding vanes to be pivoted, and horizontal displacement of the gripping strip 21 enables the vertical air-guiding vanes 20 to be pivoted. The front edges of the horizontal air-guiding vanes 19 are aligned with the front frame opening 171 of the slide 17, which frame opening, for its part, is flush with the air outflow opening 13 of the housing 12, in the front position (illustrated in FIG. 1) of the slide 17. In this front slide position, the gripping strip 21 protrudes through the air outflow opening 13 and protrudes over the front contour of the housing 12 in a manner favorable for grasping it.

The air outflow opening 13 of the housing 12 can be covered completely by means of a panel 22, the panel 22 being designed in such a manner that when the air outflow opening 13 is fully closed, the nozzle and the dashboard 10 appear as a solid surface. In the exemplary embodiment of FIGS. 1–3, the panel is designed as a rolling and closing screen 23, specifically, preferably as a flexible plastic component which is accommodated in a displaceable manner laterally in two guide grooves 24 which are each incorporated on one of each of the opposite housing walls. Alternatively, the rolling and closing screen 23 can also be composed of a multiplicity of parallel bar-type vanes which are connected to one another in a movable manner and enter with their ends in the guide grooves 24. The guide grooves 24 are of curved design and extend laterally over the entire outflow opening 13 and partially in the longitudinal direction of the housing 12. The last-mentioned section of the guide grooves 24 is of sufficiently long dimensions that the rolling and closing screen 23 can be brought completely out of the region of the air outflow opening 13 and can be accommodated by this section of the guide groove 24. In FIG. 3, the left central nozzle is illustrated with the air outflow opening 13 concealed by the rolling and closing screen 23, and the right central nozzle is illustrated with the air outflow opening 13 released by the rolling and closing screen 23.

In the exemplary embodiment of FIG. 1, the rolling and closing screen 23 and the slide 17 are driven by a common electric motor 25, the electric motor 25 displacing the slide 17 axially in the housing 12 via a gear mechanism 26 and a coupling linkage 27, and displacing the rolling and closing screen 23 in the guide grooves 24 via a gear mechanism 28. The displacement path s, by which the slide 17 can be moved from its frontmost position (illustrated in FIG. 1) into the depth of the housing 10, is dimensioned in such a manner that the air-guiding vanes 19, 20 and the gripping strip 21 release the movement space, required by the rolling and closing screen 23, within the air outflow opening 13 between the two guide grooves 24.

The electric motor 25 is switched on by means of the adjusting wheel 11 so as to rotate in one or other direction of rotation, and automatically switches off after the air outflow opening 13 is closed or opened. If the pivoting flap 15 is brought by the adjusting wheel 11 into its closing position (illustrated by dash-dotted lines in FIG. 1), the motor 25 is switched on at the end of the rotational path of the adjusting wheel 11. Via the gear mechanism 26 and the coupling linkage 27, the slide 17 is first of all moved into the depth of the housing 12 by the displacement path s, and then via the gear mechanism 28, the rolling and closing screen 23 is slid completely over the air outflow opening 13. If the rolling and closing screen 23 covers the air outflow opening 13 entirely, the electric motor 25 is shut down by a limit switch. If the adjusting wheel 11 is then moved out of this position in the opposite direction, resulting in the pivoting flap 14 being moved out of its closing position (illustrated by dash-dotted lines in FIG. 1), the electric motor 25 is switched on beforehand, and, in a reverse sequence, first of all draws the rolling and closing screen 23 away from the air outflow opening 13 and then slides the slide 17 back into its front position (illustrated in FIG. 1). When the slide 17 reaches its final position, the electric motor 25 is shut down by a limit switch.

In an alternative embodiment of the invention, the linkage 15 between the pivoting flap 14 and the adjusting wheel 11 can be omitted, and the pivoting flap 14 can be driven by the electric motor 25. The adjusting wheel 11 then just specifies the pivoting angle of the pivoting flap 15 in accordance with the desired quantity of air, and a control unit connected to the adjusting wheel 11 activates the electric motor 25 in such a manner that the pivoting flap 14 takes up the selected pivoted position.

In a further alternative design of the air nozzle in FIG. 1, the electric motor 25 can be omitted, and the displacement movement of the slide 17 can be derived from the rotational movement of the adjusting wheel 11. In this case, the adjusting wheel 11, after it has transferred the pivoting flap 14 into its closing position (illustrated by dash-dotted lines in FIG. 1), can be advanced by an additional path in which the slide 17 is displaced into the depth of the housing 12 by the displacement path s. If the adjusting wheel 11 is rotated back again, the slide 17 is first of all displaced into its front position and then, on further rotation of the adjusting wheel 11, the pivoting flap 14 is moved out of its closing position. The rolling and closing screen 23 is transferred into its closing position covering the air outflow opening 13 and into its open position completely releasing the air outflow opening 13 by hand. For this purpose, a gripping element (not illustrated in FIG. 1), which protrudes out of the air outflow opening 13 over the front side of the housing 12, is fastened to the rolling and closing screen. Alternatively, the rolling and closing screen 23 can also be actuated via the adjusting wheel 11, the closing movement of the rolling and closing screen 23 again following the displacement movement of the slide 17, or the opening movement of the rolling and closing screen 23 preceding the displacement movement of the slide 17 into its front position.

Figure 2:
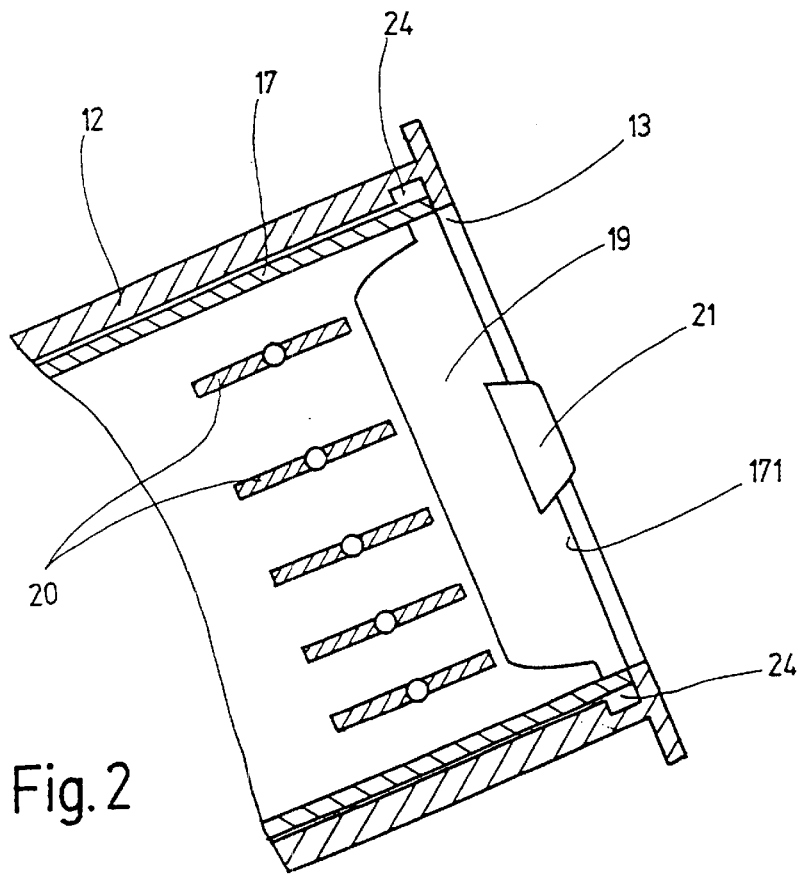
FIG. 2 shows part of a section along the line II—II in FIG. 1.
Figure 4:
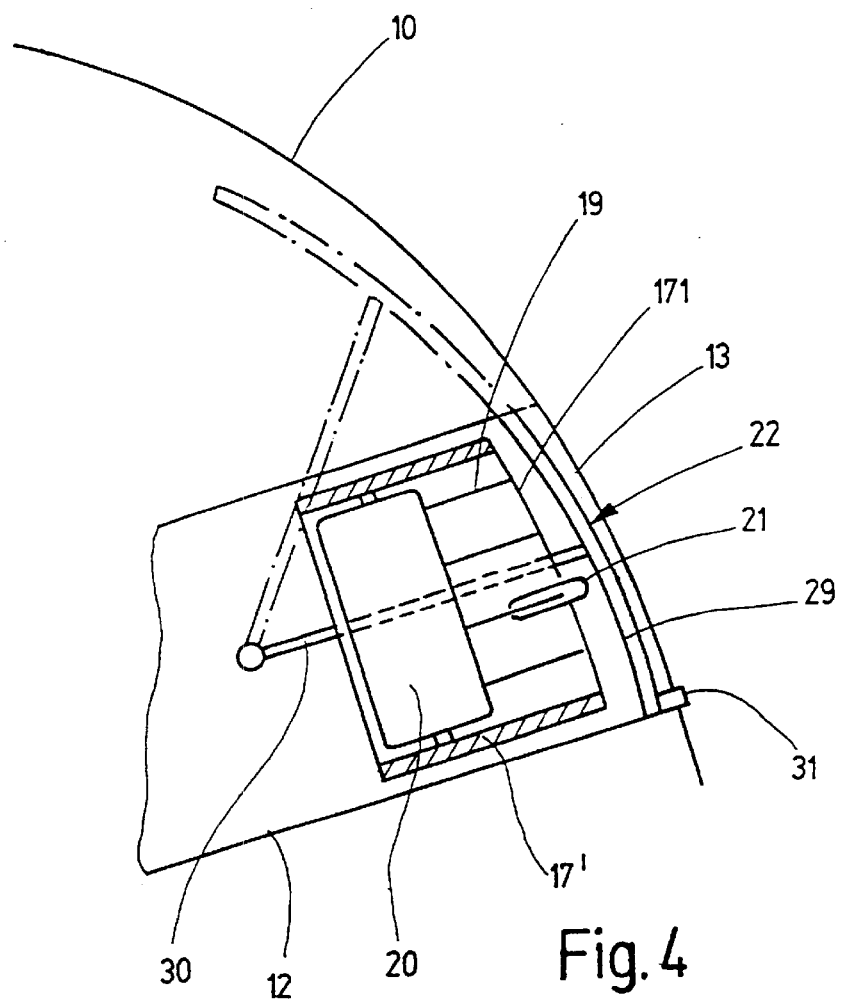
FIG. 4 shows an identical illustration as in FIG. 1 of a nozzle according to a further exemplary embodiment.

The air nozzle illustrated schematically in longitudinal section in FIG. 4 differs from the air nozzle described in FIGS. 1–3 insofar as the panel 22 for closing and releasing the air outflow opening 13 is designed as a covering plate 29 which is matched to the front contour of the housing 12 and can be pivoted by means of two arms 30 fastened rotatably to the housing 12. In the exemplary embodiment of FIG. 4, the covering plate 29 is pivoted by hand, to which end there is fastened to the lower end of the covering plate 29 a gripping element 31 which protrudes over the front contour of the housing 12 through the air outflow opening 13 and can be grasped by hand. As is not illustrated in more detail, the displacement movement of the slide 17 into the depth of the housing 12 and out of the depth of the housing 12 is derived from the pivoting movement of the covering plate 29, specifically in such a manner that before the covering plate 29 starts to be pivoted over the air outflow opening 13, the slide 17 is moved into the depth of the housing 12 by the displacement path s, and at the end of the movement pivoting the covering plate 29 away from the air outflow opening 13, is replaced back into the front position (as is illustrated in FIG. 1).

In a further exemplary embodiment, the opening of the covering plate 29 can be triggered by means of an automatic touch control (not illustrated here in more detail). Briefly touching the covering plate 29 causes its locking to be released, and the covering plate 29 pivots by means of spring force into its open position releasing the air outflow opening 13. The covering plate 29 is transferred by hand, with the opening spring becoming stressed, into its closing position.

What is claimed is:

1. A nozzle for ventilating a vehicle interior, said nozzle comprising a housing which has an air outflow opening, a panel for optionally closing and releasing the air outflow opening, the panel being fastened on the housing in a movable manner, an insert which accommodates air-guiding vanes for influencing the direction of flow of the air emerging from the air outlet opening, the insert held in the housing in a manner such that the insert can move into two end positions such that in one end position, the air-guiding vanes lie within the air outlet opening, and in the other end position, closing of the air outlet opening by the panel is possible, and wherein the insert is designed as a frame-like slide which can be displaced longitudinally in the housing and can be moved into the housing by a defined displacement path to enable the panel to close the air outflow opening.

2. The nozzle according to claim 1, wherein the slide is movable in the housing in order to close the air outlet opening.

3. The nozzle according to claim 1, further comprising a pivoting flap arranged in the housing for regulating the air flowing to the air outflow opening, a manually operable adjusting wheel for pivoting said pivoting flap and wherein the slide is coupled to the adjusting wheel that the slide is moved by the adjusting wheel into the housing and is moved out of the housing.

4. The nozzle according to claim 1, wherein the panel is actuated manually.

5. The nozzle according to claim 1, wherein the panel is connected to the slide.

6. The nozzle according to claim 5, wherein when the panel is actuated manually and the slide moves in the housing.

7. The nozzle according to claim 1, further comprising a gripping element arranged on the panel.

8. The nozzle according to claim 4, further comprising an automatic touch control adjacent the panel, so that when the touch control, is triggered manually, the panel moves into its open position in order to actuate the air outflow opening.

9. The nozzle according to claim 1, further comprising a pivoting flap arranged in the housing for regulating the air flowing to the air outlet opening and a manually operable adjusting wheel for pivoting the pivoting flap, and wherein movement of the panel is derived from the actuation of the adjusting wheel in such a manner that after the pivoting flap is completely closed, the panel is moved over the air outflow opening and is removed from the air outlet opening before or at the beginning of the opening movement of the pivoting flap.

10. The nozzle according to claim 1, wherein the panel and the slide are actuated by a common electric motor.

11. The nozzle according to claim 10, further comprising a pivoting flap for regulating the air flowing to the air outflow opening arranged in the housing.

12. The nozzle according to claim 11, further comprising an adjusting wheel and wherein the magnitude of the pivoting with the electric motor of the pivoting flap is predetermined as a desired value by the adjusting wheel, such that the actuation of the slide and panel can be triggered by the adjusting wheel.

13. The nozzle according to claim 1, wherein the panel is designed as a displacement element which is guided in grooves in the housing, and in that the displacement path of the slide is dimensioned in such a manner that the air-guiding vanes are moved entirely out of the region of that section of the guide grooves which runs along the air outlet opening.

14. The nozzle according to claim 1, wherein the panel is designed as a covering plate which is matched to the front contour of the housing and can be pivoted by two arms fastened rotatably on the housing.

* * * * *